United States Patent Office 3,294,638
Patented Dec. 27, 1966

3,294,638
METHOD AND COMPOSITIONS EMPLOYING 2-ALKYL-3-PIPERIDINOPYRAZINES
Wilson B. Lutz, North Manchester, Ind., assignor to Warner-Lambert Pharmaceutical Company, Morris Plains, N.J., a corporation of Delaware
No Drawing. Filed Nov. 20, 1963, Ser. No. 325,173
4 Claims. (Cl. 167—65)

The present invention relates to new and novel pyrazine derivatives of the formula:

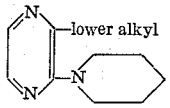

wherein said lower alkyl substituent may be methyl or ethyl and relates more particularly to therapeutic compositions containing these pyrazine compounds. This invention also relates to a method for the relief of mental depression by the administration to mentally depressed patients of the novel therapeutic compositions of this invention. This application is a continuation-in-part of my copending application Serial No. 180,342, filed March 16, 1962; the latter being a continuation-in-part of application Serial No. 114,678, filed June 5, 1961, both of which are now abandoned.

Among the compounds useful in the practice of this invention are, for example, 2-methyl-3-piperidinopyrazine, 2-ethyl-3-piperidinopyrazine, and the pharmaceutically acceptable nontoxic acid addition salts of these compounds as hereinafter described.

The pharmacological action of the novel pyrazine compounds of this invention is believed to be due in a measure to their ability to inhibit the enzyme monoamine oxidase. This activity, surprisingly, is observed only in vivo and unlike other known monoamine oxidase inhibitors is inactive in vitro. These novel pyrazine compounds also exhibit imipramine-like activity. This activity is manifested by their ability to protect against a drop in body temperature as produced by reserpine. This unique property supplements their general antidepressant activity and gives them a broader pharmacodynamic basis in providing relief of mental depression. In addition, these compounds have been found to lower blood pressure.

The novel compounds of this invention are obtained by reacting a compound of the formula:

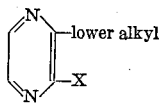

wherein X is a halogen such as chlorine, bromine or iodine with piperidine. The halogen is replaced by the free nitrogen of the heterocyclic amine ring and the pyrazine nucleus is linked directly through the carbon in 3-position to the nitrogen of the heterocyclic ring structure.

The 2-alkyl-3-halopyrazine intermediates employed are disclosed, for example, by G. Karmas, et al., J. Amer. Chem. Soc. 74, 1580 (1952).

In the synthesis of the above compounds an aqueous reaction mixture comprising the 2-alkyl-3-halopyrazine and an excess of the piperidine is refluxed with stirring until the completion of the coupling reaction which normally requires from about 2 to 6 days. An alkali metal hydroxide such as, for example, sodium hydroxide or potassium hydroxide may also be included in the mixture to neutralize the by-product, hydrohalic acid. The crude reaction product is recovered by extraction of the aqueous phase with a preferential solvent such as ether and is separated from the solvent by removal of the solvent as by evaporation, for example.

The 2-alkyl-3-piperidino pyrazine thus obtained contains 2-alkyl-6-piperidinopyrazine as a by-product which can be removed by the following purification procedure.

First, the crude product is dissolved in a suitable solvent such as ether, ethyl acetate and the like. The resulting solution is treated with an ethereal solution containing an amount of hydrogen chloride substantially equivalent stoichiometrically to the by-product isomer, which addition causes the precipitation of the unwanted 2-alkyl-6-piperidino-pyrazine as a hydrochloride salt. The precipitate may be removed by filtration and the filtrate is treated further with ethereal hydrogen chloride. The desired 2-alkyl-3-piperidino-pyrazine then precipitates as its hydrochloride salt, which can be purified by crystallization techniques employing solvents such as ethyl acetate.

The corresponding free base is readily obtained by treating an aqueous solution of the hydrochloride salt with a base such as sodium hydroxide or potassium carbonate and recovering the oily precipitate.

Alternatively, the crude reaction product containing the unwanted isomer may be purified by distillation. Thus, for example, 2-ethyl-3-piperidinopyrazine may be separated from 2-ethyl-6-piperidinopyrazine by distilling at 0.3 mm. pressure at 88°–90° C. and recovering the desired 2-ethyl-3-piperidinopyrazine as the distillate.

The compounds of this invention may be converted into their pharmaceutically acceptable nontoxic acid addition salts by conventional salt forming procedures. Typical salts are those formed with maleic, fumaric, succinic, citric, sulfonic, cyclohexyl sulfamic, sulfuric, hydrochloric, hydrobromic, phosphoric, nitric or the like acids. These salts may be prepared, for example, by reacting the free pyrazine base dissolved in a solvent such as ethyl ether, ethyl acetate, isopropanol and the like with an equal molar ratio of selected acid. The reaction may be effected at ambient temperature such as 20° to 30° C. The resulting acid addition salt precipitates out of solution and may be recovered by filtration and purified by recrystallization techniques.

For therapeutic use, the compounds of this invention, either as the free base or in the form of a salt, may be combined with solid or liquid pharmaceutical diluents and carriers such as lactose, starch, gums, deionised water and the like to provide convenient dosage forms such as tablets, enteric coated tablets, capsules, solutions, suspensions, suppositories, elixirs and the like. The monosulfate salts because of their stability towards atmospheric changes such as temperature or pressure are generally the preferred salts to be incorporated in the dosage forms. A useful and effective total daily dosage in humans is from 45 to 120 mgms. of equivalent free base administered in the form of several divided doses.

It has been found that mentally depressed patients respond very well to the administration of 45 mg. daily of 2-methyl-3-piperidinopyrazine as the monosulfate in several divided doses.

The following examples are included in order further to illustrate this invention, all temperatures being given in degree centigrade.

*Example 1.—2-methyl-3-piperidinopyrazine hydrochloride*

In a 100 ml. round-bottom three-necked flask equipped with mechanical stirrer, condenser and electrically heated oil bath are placed 10 g. (0.078 mols) of 2-methyl-3-chloropyrazine, 15.4 ml. (0.156 mols) of piperidine and a solution of 4.36 g. (0.078 mols) of potassium hydroxide in 15 ml. of water. The mixture is heated to reflux with stirring for four days and is then cooled and transferred to a 250 ml. separatory funnel with about 50 ml. of water and 30 ml. of ether. The aqueous layer is drawn off and extracted with three 25 ml. portions of ether. The combined ether extracts are dried over potassium carbonate, filtered and concentrated to an oil on the steam bath. Two successive five ml. portions of toluene are then added and evaporated using a rotating evaporator with bath temperature 70° and 0.5 mm. pressure. This treatment serves to remove any residual piperidine. The resulting oil is dissolved in 75 ml. of ethyl acetate and carefully treated with 20 ml. of ether containing 0.02 mols of hydrogen chloride. A crop of yellow by-product material, melting point 159°–165°, separates and is filtered off. Further treatment of the filtrate with ethereal hydrogen chloride gives 13.65 g. (82% of theory) of impure product, melting at 95°–111°. Further recrystallization from ethyl acetate yields pure 2-methyl-3-piperidinopyrazine hydrochloride as yellow needles or platelets, melting point 112.2°–114.2°.

*Analysis.*—Calc.: C, 56.20; H, 7.55; N, 19.66; Cl, 16.59. Found: C, 56.43; H, 7.40; N, 19.78; Cl, 16.57.

*Example 2.—2-methyl-3-piperidinopyrazine*

To a solution of 50 grams of 2-methyl-3-piperidinopyrazine hydrochloride in about 250 ml. of water is added with stirring in aqueous solution of sodium hydroxide until precipitation of an oil phase is complete. The solution is then extracted with ether. The ether extracts are combined and the ether removed in vacuo to obtain 2-methyl-3-piperidinopyrazine as the free base.

*Example 3.—2-methyl-3-piperidinopyrazine monosulfate*

To a solution of 5.31 grams (0.03 mols) of 2-methyl-3-piperidinopyrazine base in 25 ml. isopropanol is added 2.94 grams (0.03 mols) of concentrated sulfuric acid in 20 ml. of isopropanol. The mixture is then diluted with about 50 ml. of ethyl acetate and 50 ml. of ether. 2-Methyl-3-piperidinopyrazine monosulfate precipitates in the form of yellow crystals which after recovery by filtration, washing with ethyl acetate and drying melts at 131° to 132° C.

*Example 4.—2-ethyl-3-piperidinopyrazine*

A mixture of 6.0 g. of 2-ethyl-3-chloropyrazine and 30 ml. of piperidine is refluxed for 24 hours. The piperidine hydrochloride formed is filtered from the cooled reaction mixture and the filtrate is concentrated to a heavy oil by evaporation. The oil is then taken up in several volumes of ether which is washed twice with 20 ml. of water and the ether solution dried over magnesium sulfate. The ether is distilled off and the residual oil purified by distillation at 0.3 mm. pressure, the oil coming over at 88°–90° C. at this pressure. On redistillation at 0.25 mm. pressure, 4.0 g. of 2-ethyl-3-piperidinopyrazine is obtained boiling at 85° C.

*Analysis.*—Calc.: C, 69.07; H, 8.96; N, 21.97. Found: C, 69.20; H, 9.11; N, 21.70.

*Example 5*

A mixture of 23.3 grams of 2-methyl-3-piperidinopyrazine monosulfate, 300 grams of anhydrous calcium sulfate, 4 grams of acacia and 25 grams of corn starch is granulated by admixture with a sufficient quantity of water. The granules are passed through a 16 mesh screen and are then dried at 50°–55°. The dried granules are again passed through a 16 mesh screen, 1.5 grams of magnesium stearate are then added thereto and the mixture is compressed on a rotary tablet press at 353.8 mg. per tablet containing 15 mg. of free 2-methyl-3-piperidinopyrazine base.

*Example 6*

A solution of 5 parts of 2-methyl-3-piperidinopyrazine, 100 parts of propylene glycol, 17 parts of sodium phosphate dibasic and about 878 parts of distilled water is sterilized. The sterile solution is then distributed aseptically into sterile ampuls at 1.1 ml. per ampul. Each ampul contains 15 mg. of free 2-methyl-3-piperidinopyrazine base.

*Example 7*

A mixture of 23.3 grams of 2-methyl-3-piperidinopyrazine monosulfate and 400 grams of lactose is distributed into #5 capsules at 423.3 mg. per capsule. Each capsule contains 15 mg. of the free base.

It is understood that the foregoing detailed description is given merely by way of illustration and that many variations may be made therein without departing from the spirit of my invention.

Having described my invention, what I desire to secure by Letters Patent is:

1. Process for the treatment of mentally depressed patients which comprises administering to said patients an effective amount of a compound selected from the group consisting of 2-methyl-3-piperidinopyrazine, 2-ethyl-3-piperidinopyrazine and the pharmaceutically acceptable nontoxic acid addition salts thereof.

2. A therapeutic composition in dosage unit form which comprises as active ingredient per dosage unit from 15 to 30 mg. of a compound selected from the group consisting of 2-methyl-3-piperidinopyrazine and the pharmaceutically acceptable nontoxic acid addition salts thereof in combination with a solid, nontoxic orally ingestible pharmaceutical carrier.

3. A solid antidepressant composition in a form suitable for oral administration which comprises as active ingredients 15 to 30 mg. of a compound selected from the group consisting of 2-methyl-3-piperidinopyrazine and the pharmaceutically acceptable nontoxic acid addition salts thereof in combination with a solid, nontoxic orally ingestible pharmaceutical carrier.

4. A sterile liquid antidepressant composition suitable for parental administration containing as active ingredient a compound selected from the group consisting of 2-methyl-3-piperidinopyrazine and the pharmaceutically acceptable acid addition salts thereof, a liquid carrier for said active ingredient and at least one excipient selected from the group consisting of wetting, dispersing and suspending agents.

References Cited by the Examiner
UNITED STATES PATENTS
3,172,889   3/1965   Conrad _____ 260—250

JULIAN S. LEVITT, *Primary Examiner.*
S. J. FRIEDMAN, *Assistant Examiner.*